(12) United States Patent
Fecarotta

(10) Patent No.: US 12,544,843 B2
(45) Date of Patent: Feb. 10, 2026

(54) RECIPROCATING WIRE SAW DEVICE

(71) Applicant: John Fecarotta, Downers Grove, IL (US)

(72) Inventor: John Fecarotta, Downers Grove, IL (US)

( * ) Notice: Subject to any disclaimer, the term of this patent is extended or adjusted under 35 U.S.C. 154(b) by 401 days.

(21) Appl. No.: 18/152,288

(22) Filed: Jan. 10, 2023

(65) Prior Publication Data

US 2024/0033837 A1     Feb. 1, 2024

Related U.S. Application Data

(60) Provisional application No. 63/392,920, filed on Jul. 28, 2022.

(51) Int. Cl.
   *B23D 57/00*     (2006.01)
(52) U.S. Cl.
   CPC ..... *B23D 57/0015* (2013.01); *B23D 57/0053* (2013.01); *B23D 57/0084* (2013.01)
(58) Field of Classification Search
   CPC ............ B23D 57/0053; B23D 57/0084; B23D 57/0015
   USPC .............................................................. 83/13
   See application file for complete search history.

(56) References Cited

U.S. PATENT DOCUMENTS

| | | | | |
|---|---|---|---|---|
| 5,239,978 | A * | 8/1993 | Plangetis | B27G 19/00 451/454 |
| 2008/0104848 | A1* | 5/2008 | Cooke | B23D 57/0015 30/92 |
| 2011/0247224 | A1* | 10/2011 | Hernandez | B23D 57/0069 30/517 |
| 2015/0042052 | A1* | 2/2015 | Furusawa | B23B 31/10 279/141 |
| 2017/0133965 | A1* | 5/2017 | Ichikawa | B25F 5/00 |
| 2018/0294662 | A1* | 10/2018 | Polakowski | H02J 7/0045 |
| 2023/0070919 | A1* | 3/2023 | Clevett | B23D 61/18 |
| 2023/0201934 | A1* | 6/2023 | Funabiki | B23D 59/006 30/390 |

FOREIGN PATENT DOCUMENTS

CN     110744137 A *     2/2020     ......... B23D 57/0015

OTHER PUBLICATIONS

CN110744137 Translation (Year: 2025).*

* cited by examiner

*Primary Examiner* — Nhat Chieu Q Do
(74) *Attorney, Agent, or Firm* — Brennan, Manna & Diamond, LLC

(57) ABSTRACT

The present invention relates to a reciprocating wire saw device. The device is primarily comprised of a body with at least one handle, at least one trigger, at least one battery, and a second end with at least one blade and at least one plunger. The device preferably has two oscillating arms that oscillate independently via the motor. Therefore, each end of a wire blade can be attached to each arm such that oscillation of the arms allow the blade to cut a pipe or other similar object.

17 Claims, 4 Drawing Sheets

RECIPROCATING WIRE SAW DEVICE

CROSS-REFERENCE TO RELATED APPLICATION

The present application claims priority to, and the benefit of, U.S. Provisional Application No. 63/392,920, which was filed on Jul. 28, 2022, and is incorporated herein by reference in its entirety.

FIELD OF THE INVENTION

The present invention relates generally to the field of saws. More specifically, the present invention relates to a reciprocating wire saw device primarily comprised of a body with at least one handle, at least one trigger, at least one battery, and a second end with at least one blade and at least one plunger. The device preferably has two oscillating arms that oscillate independently via the motor. Therefore, each end of a wire blade can be attached to each arm such that oscillation of the arms allow the blade to cut a pipe or other similar object. Accordingly, the present disclosure makes specific reference thereto. Nonetheless, it is to be appreciated that aspects of the present invention are also equally applicable to other like applications, devices, and methods of manufacture.

BACKGROUND

Reciprocating saws are often used to cut pipes. However, some pipes are positioned in tight spaces where a typical reciprocating saw cannot be used due to space constraints. In addition, cutting pipes near concrete or drywall often result in bent or broken blades and/or damaged walls.

Therefore, there exists a long-felt need in the art for an improved saw. There also exists a long-felt need in the art for a reciprocating wire saw device that can be used to cut pipes in tight spaces. In addition, there exists a long-felt need in the art for a reciprocating wire saw device that does not damage nearby walls or the blade of the device during use.

The subject matter disclosed and claimed herein, in one embodiment thereof, comprises a reciprocating wire saw device. The device is primarily comprised of a body with at least one handle, at least one trigger, at least one battery, and a second end with at least one blade and at least one plunger. In the preferred embodiment, the device has two oscillating arms that oscillate independently via the motor. As a result, each end of a wire blade can be attached to each arm such that oscillation of the arms allow the blade to cut a pipe or other similar object.

In this manner, the reciprocating wire saw device of the present invention accomplishes all of the foregoing objectives and provides an improved saw. As a result, the device can be used to cut pipes in tight spaces. In addition, while cutting pipes in tight spaces, the device does not damage nearby walls or the blade of the device during use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a reciprocating wire saw device. The device is primarily comprised of a body with at least one handle, at least one trigger, at least one battery, and a second end with at least one blade and at least one plunger. The first end of the body is comprised of a handle that may be comprised of at least one grip. The handle is also comprised of at least one trigger, wherein depressing the trigger activates the oscillation of the blade. The handle preferably receives at least one removable battery that is stored within the handle during use. The battery preferably powers at least one brushless motor located within the body.

The body also has a second end with at least one opening. At least one oscillating arm powered by the motor oscillates back and forth (i.e., first end to second end) within the opening. The oscillating arm has a first end and a second end, wherein both ends have at least one channel that partially extends inwards into the arm from each end. Each channel allows the blade to attach to each end of the arm. Once within each channel, the blade may be secured within the arm via at least one fastener. When engaged, the fastener preferably blocks each channel such that the blade cannot escape each channel. As a result of the construction of the oscillating arm and fastener, a user can easily remove the blade from the arm to replace as needed. In differing embodiments, the blade may be any wire blade type known in the art such as, but not limited to, a carbon blade, an abrasive blade, a diamond blade, etc. The second end of the body is also comprised of at least one finger guard positioned behind the arm to prevent the arm and/or blade from striking the hand/fingers of a user while the device is in use. The second end is also comprised of at least one plunger that is preferably a spring-loaded plunger. During use, the plunger pushes against the surface of a pipe to keep the blade in tension.

The device is also comprised of a method of use. First, a first end of the blade is placed in the channel of the first end of the arm. Then, the first end is secured within the channel via the fastener. Next, the blade is placed around the pipe and the second end of the blade is placed into the channel of the second end of the arm. Then, the second end is secured within the channel via the fastener. The trigger can then be depressed to activate the motor and cause the arm to oscillate, thereby causing the blade to move to cut the pipe.

Accordingly, the reciprocating wire saw device of the present invention is particularly advantageous as it provides an improved saw that can be used to cut pipes in tight spaces. While cutting pipes in tight spaces, the device does not damage nearby walls or the blade of the device during use. In this manner, the reciprocating wire saw device overcomes the limitations of existing saws known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
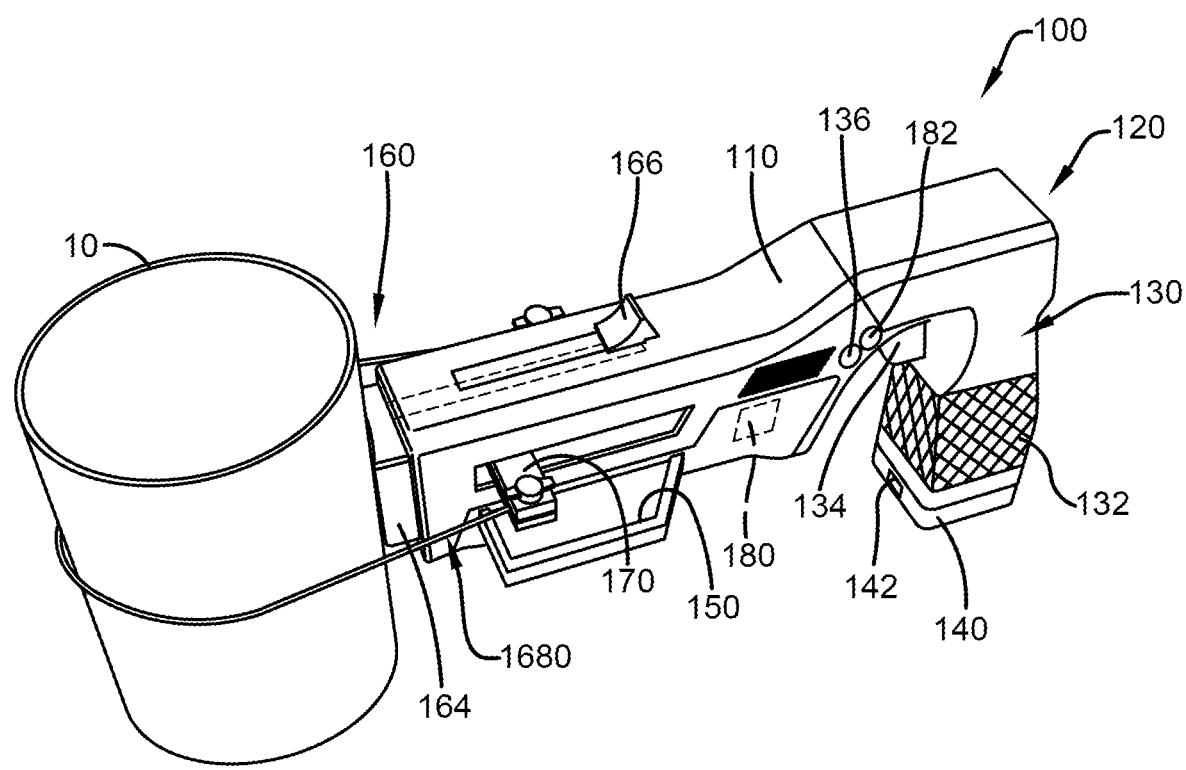
FIG. 1 illustrates a perspective view of one potential embodiment of a reciprocating wire saw device of the present invention while being used to cut a pipe in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved saw. There also exists a long-felt need in the art for a reciprocating wire saw device that can be used to cut pipes in tight spaces. In addition, there exists a long-felt need in the art for a reciprocating wire saw device that does not damage nearby walls or the blade of the device during use.

The present invention, in one exemplary embodiment, is comprised of a reciprocating wire saw device primarily comprised of a body with at least one handle, at least one trigger, at least one battery, and a second end with at least one blade and at least one plunger. The first end of the body is comprised of a handle that may be comprised of at least one grip. In addition, the handle is comprised of at least one trigger, wherein depressing the trigger activates the oscillation of the blade. The handle preferably receives at least one removable battery that is stored within the handle during use. The battery preferably powers at least one brushless motor located within the body.

The body also has a second end with at least one opening, wherein at least one oscillating arm powered by the motor oscillates back and forth (i.e., first end to second end) within the opening. The oscillating arm has a first end and a second end, wherein both ends have at least one channel that partially extends inward into the arm from each end. Each channel allows the blade to attach to each end of the arm. Once within each channel, the blade may be secured within the arm via at least one fastener. When engaged, the fastener preferably blocks each channel such that the blade cannot escape each channel. As a result of the construction of the oscillating arm and fastener, a user can easily remove the blade from the arm to replace as needed. In various embodiments, the blade may be any wire blade type known in the art such as, but not limited to, a carbon blade, an abrasive blade, a diamond blade, etc. The second end of the body is also comprised of at least one finger guard positioned behind the arm to prevent the arm and/or blade from striking the hand/fingers of a user while the device is in use. The second end is also comprised of at least one plunger that is preferably a spring-loaded plunger. During use, the plunger pushes against the surface of a pipe to keep the blade in tension.

The device is also comprised of a method of use. First, a first end of the blade is placed in the channel of the first end of the arm. Then, the first end is secured within the channel via the fastener. Next, the blade is placed around the pipe and the second end of the blade is placed into the channel of the second end of the arm. Then, the second end is secured within the channel via the fastener. The trigger can then be depressed to activate the motor and cause the arm to oscillate, thereby causing the blade to move to cut the pipe.

Accordingly, the reciprocating wire saw device of the present invention is particularly advantageous as it provides an improved saw that can be used to cut pipes in tight spaces. While cutting pipes in tight spaces, the device does not damage nearby walls or the blade of the device during use. In this manner, the reciprocating wire saw device overcomes the limitations of existing saws known in the art.

Referring initially to the drawings, FIG. 1 illustrates a perspective view of one potential embodiment of a reciprocating wire saw device 100 of the present invention while being used to cut a pipe 10 in accordance with the disclosed architecture. The device 100 is primarily comprised of a body 110 with at least one handle 130, at least one trigger 134, at least one battery 140, and a second end 160 with at least one blade 168 and at least one plunger 164. Unless otherwise specified herein, the device 100 and all components are preferably made from a rigid plastic material such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc., or a durable metal such as, but not limited to, stainless steel or aluminum. Further, the device 100 is preferably waterproof and/or water resistant.

The first end 120 of the body 110 is comprised of a handle 130. The handle 130 may be any ergonomic shape known in the art that allows a user to easily grasp the handle 130. To aid in a user grasping the handle 130, the handle 130 may be comprised of at least one grip 132. The body 110 may have a second grip 132 positioned on a differing area of the body 110 in addition to the handle 130. The grip 132 is preferably made from a textured, non-slip rubber material such as, but not limited to, natural rubbers, neoprene rubber elastomer, silicone rubber elastomer, ethylene propylene diene monomer rubber, butyl rubber, nitrile rubber, buna-n rubber, styrene-butadiene rubber elastomers, viton rubber elastomer, diaphragm rubber, thermoplastic rubber, etc. In addition, the body 110 may be contoured to also receive a hand of the user, in addition to the handle 130.

The handle 130 is also comprised of at least one trigger 134, wherein depressing the trigger 134 activates the oscillation of the blade 168. The trigger 134 may have at least one internal and/or external safety 136 that must be engaged before the trigger 134 can be pressed for safety purposes.

The handle 130 preferably receives at least one removable battery 140 that is stored within the handle 130 during use. The battery 140 may be a disposable battery 140 or a rechargeable battery 140 in the form of an alkaline, nickel-cadmium, nickel-metal hydride battery 140, etc., such as any 3V-18 volts DC battery 140 or other conventional battery 140 such as A, AA, AAA, etc., that supplies power to the device 100. Throughout this specification the terms "battery" and "batteries" may be used interchangeably to refer to one or more wet or dry cells or batteries 140 of cells in which chemical energy is converted into electricity and used as a source of DC power. References to recharging or replacing batteries 140 may refer to recharging or replacing individual cells, individual batteries 140 of cells, or a package of multiple battery cells as is appropriate for any given battery 140 technology that may be used. Additionally, the battery 140 may be recharged by at least one USB port 142 or any charging port or charging methods known in the art. The battery 140 preferably powers at least one brushless motor 180 located within the body 110. The motor 180 has at least one speed, but preferably has a plurality of speeds such as but not limited to low, medium, and high.

Figure 2:
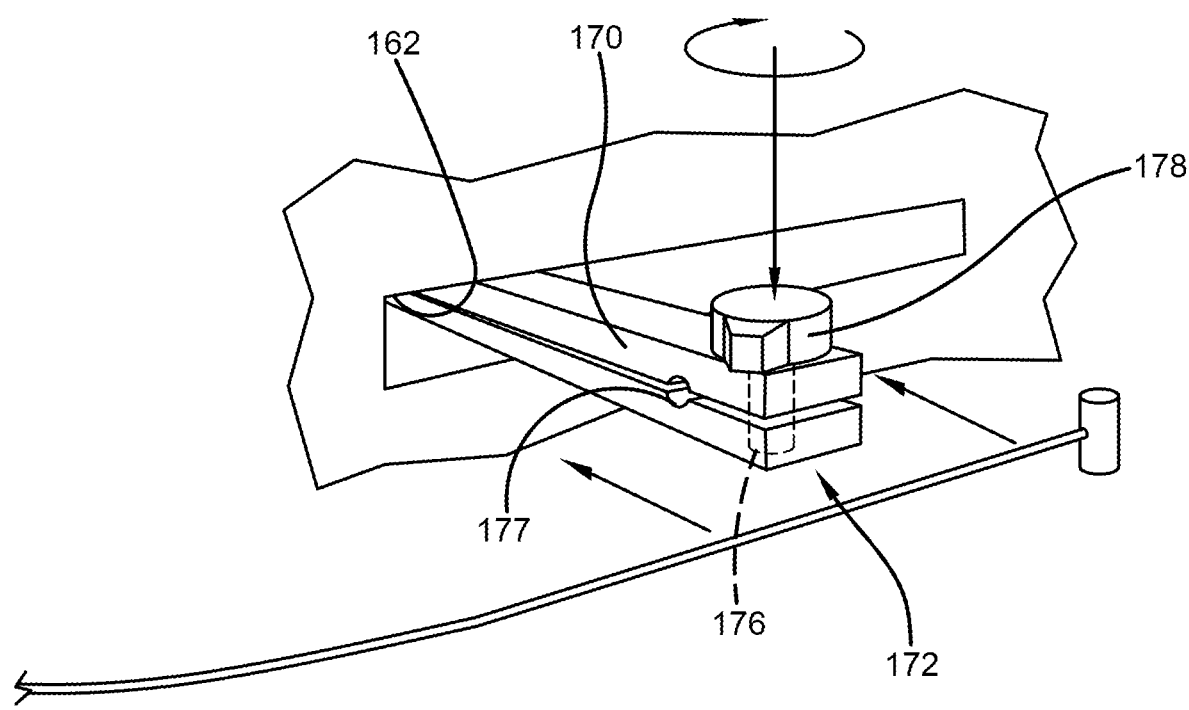
FIG. 2 illustrates an enhanced perspective view of an oscillating arm of one potential embodiment of a reciprocating wire saw device of the present invention in accordance with the disclosed architecture.
Figure 3:
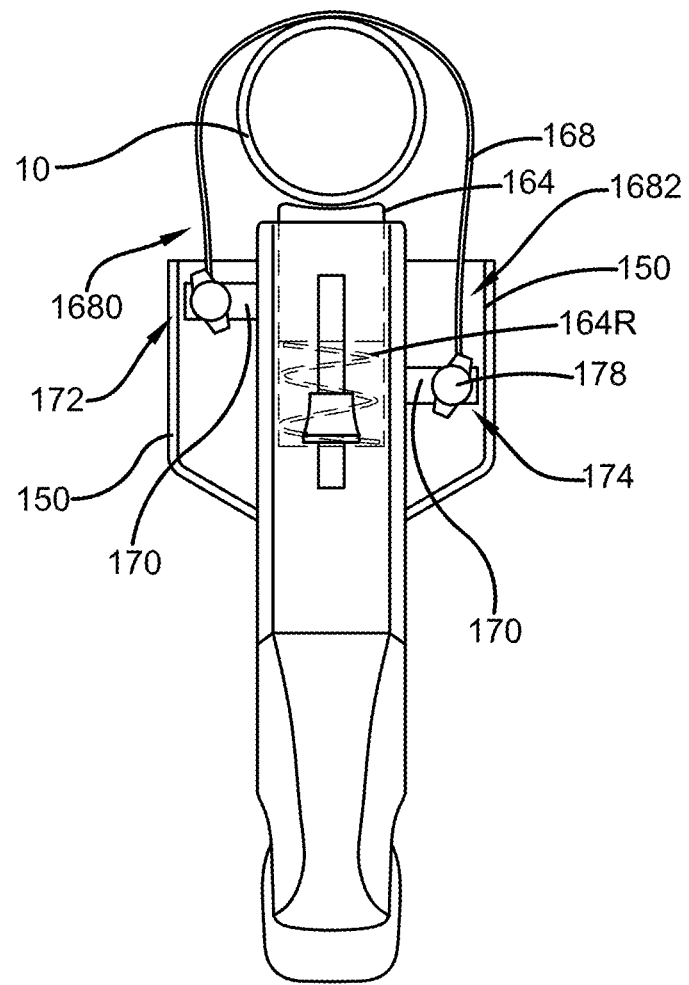
FIG. 3 illustrates a top view of one potential embodiment of a reciprocating wire saw device of the present invention while being used to cut a pipe in accordance with the disclosed architecture.

FIG. 2 illustrates an enhanced perspective view of an oscillating arm 170 of one potential embodiment of a reciprocating wire saw device 100 of the present invention in accordance with the disclosed architecture. The body 110 also has a second end 160. The second end 160 has at least one opening 162. At least one oscillating arm 170 powered by the motor 180 oscillates back and forth (i.e., first end 120 to second end 160) within the opening 162. In one embodiment, the device 100 has two oscillating arms 170 that oscillate opposite of one another, as seen in FIG. 3. The arm 170 has a first end 172 and a second end 174. Both ends 172, 174 have at least one channel 176. The channel 176 partially extends inward into the arm 170 from each end 172, 174. Each channel 176 allows the blade 168 to attach to each end 172, 174 of the arm 170. Once within each channel 176, the blade 168 may be secured within the arm 170 via at least one fastener 178. When engaged, the fastener 178 preferably blocks each channel 176 such that the blade 168 cannot escape each channel 176. The fastener 178 is preferably a threaded thumb screw but may be any similar fastener of the like that can be tightened. Each channel 176 may be comprised of at least one receiving area 177 that is preferably circular. The area 177 better secures the blade 168 within the channel 176 via its shape. Due to the oscillating arm 170 and fastener 178, a user can easily remove the blade 168 from the arm 170 to replace as needed. In differing embodiments, the blade 168 may be any wire blade type known in the art such as, but not limited to, a carbon blade, an abrasive blade, a diamond blade, etc.

The second end 160 of the body 110 is also comprised of at least one finger guard 150. Preferably, the body 110 has two finger guards 150, one on each side of the arm 170. The finger guards 150 are positioned behind the arm 170 to prevent the arm 170 and/or blade 168 from striking the hand/fingers of a user while the device 100 is in use.

The second end 160 is also comprised of at least one plunger 164. The plunger 164 can be extended/retracted as needed from the body 110 using at least one handle 166. The plunger 164 may be any plunger type known in the art but is preferably a spring 164R loaded plunger. During use, the plunger 164 pushes against the surface of a pipe 10 to keep the blade 168 in tension. It should be appreciated that the device 100 may also have at least one button 182. The button 182 may perform a plurality of functions such as, but not limited to, turning the device 100 on/off, changing the speed of the motor 180, etc.

Figure 4:
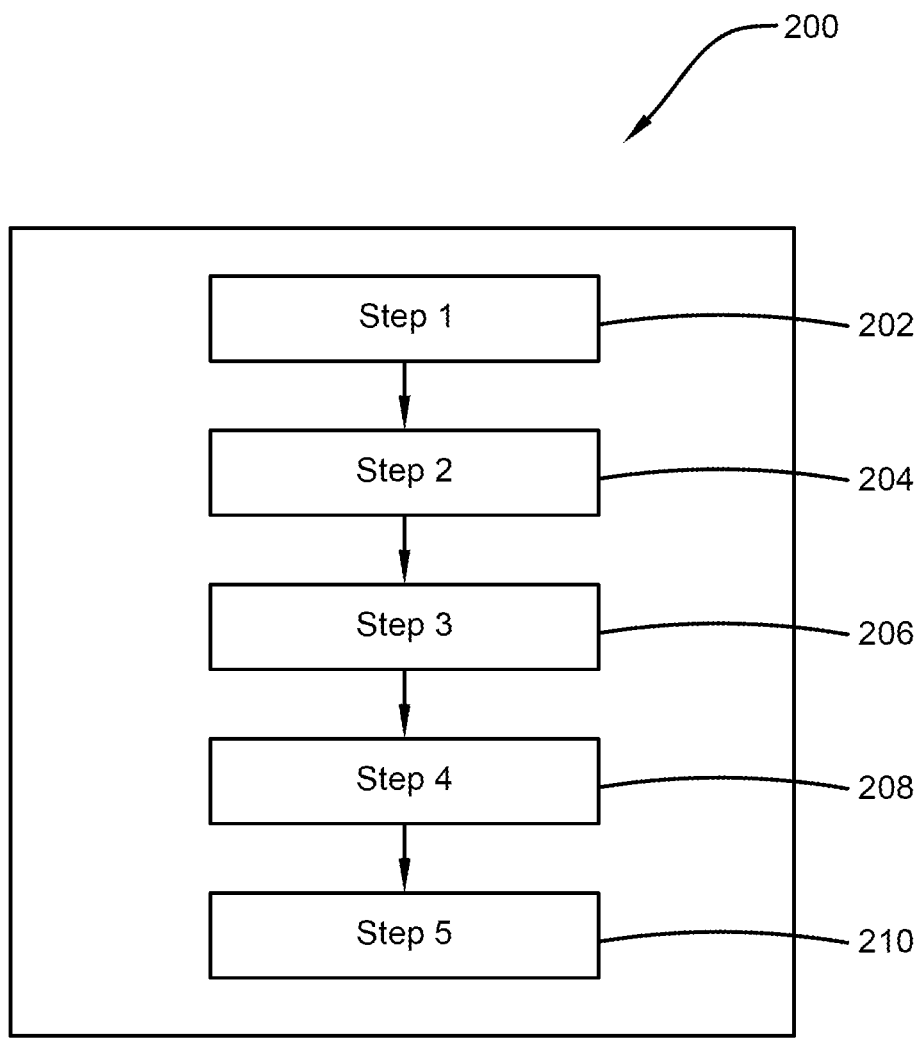
FIG. 4 illustrates a flowchart of one potential method of using one potential embodiment of a reciprocating wire saw device of the present invention while being used to cut a pipe in accordance with the disclosed architecture.

FIG. 4 illustrates a flowchart of one potential method 200 of using one potential embodiment of a reciprocating wire saw device 100 of the present invention while being used to cut a pipe in accordance with the disclosed architecture. The device 100 is also comprised of a method 200 of use. First, a first end 1680 of the blade 168 is placed in the channel 176 of the first end 172 of the arm 170 [Step 202]. Next, the first end 1680 is secured within the channel 176 via the fastener 178 [Step 204]. Then, the blade 168 is placed around the pipe 10 and the second end 1682 of the blade 168 is placed into the channel 176 of the second end 174 of the arm 170 [Step 206]. Then, the second end 1682 is secured within the channel 176 via the fastener 178 [Step 208]. The trigger 134 can then be depressed to activate the motor 180 and cause the arm 170 to oscillate, thereby causing the blade 168 to move to cut the pipe 10 [Step 210]. To remove the blade 168, a user need only simply do the inverse of Steps 202 to 208.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "reciprocating wire saw device" and "device" are interchangeable and refer to the reciprocating wire saw device 100 of the present invention.

Notwithstanding the foregoing, the reciprocating wire saw device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the reciprocating wire saw device 100 as shown in the FIGS. are for illustrative purposes only, and that many other sizes and shapes of the reciprocating wire saw device 100 are well within the scope of the present disclosure. Although the dimensions of the reciprocating wire saw device 100 are important design parameters for user convenience, the reciprocating wire saw device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A reciprocating wire saw device comprising:
   a body;
   a handle comprising a texturized rubber grip;
   a trigger;
   a battery;
   a motor configured to oscillate an oscillating arm;
   a plunger; and
   a wire blade,
   wherein the plunger is extendable and retractable from a second end of the body via a plunger handle and is configured to push against a pipe to keep the wire blade in tension around the pipe, and wherein the plunger is a spring-loaded plunger.

2. The reciprocating wire saw device of claim 1, wherein the wire blade attaches to the oscillating arm.

3. The reciprocating wire saw device of claim 2, wherein the trigger activates the motor.

4. A reciprocating wire saw device comprising:
   a body;
   a handle comprised of a grip;
   a trigger;
   a battery;
   a plunger;
   a wire blade;
   a first oscillating arm having a first channel; and
   a second oscillating arm having a second channel;
   a motor configured to oscillate the first and second oscillating arms,
   wherein the plunger is extendable and retractable from a second end of the body via a plunger handle and is configured to push against a pipe to keep the wire blade in tension around the pipe,
   wherein the wire blade is a carbon wire blade, and wherein the plunger is a spring-loaded plunger,
   the second oscillating arm to oscillate,
   wherein the wire blade is a carbon wire blade, and wherein the plunger is a spring-loaded plunger.

5. The reciprocating wire saw device of claim 4, wherein the reciprocating wire saw device is water-resistant.

6. The reciprocating wire saw device of claim 4, wherein the blade attaches to the at least one of the first and second oscillating arms.

7. The reciprocating wire saw device of claim 4 further comprised of a safety.

8. The reciprocating wire saw device of claim 7, wherein the safety prevents the depressing of the trigger.

9. The reciprocating wire saw device of claim 4, wherein the battery is a 12V battery or an 18V battery.

10. The reciprocating wire saw device of claim 9, wherein the battery is comprised of a USB port.

11. The reciprocating wire saw device of claim 4, wherein the first oscillating arm is comprised of a first fastener and the second oscillating arm is comprised of a second fastener.

12. The reciprocating wire saw device of claim 11, wherein each of the first fastener and the second fastener is a threaded thumb screw.

13. The reciprocating wire saw device of claim 4, wherein the first channel of the first oscillating arm is comprised of a first receiving area, and the second channel of the second oscillating arm is comprised of a second receiving area.

14. The reciprocating wire saw device of claim 4, wherein the body is comprised of a finger guard positioned behind each of the first oscillating arm and the second oscillating arm.

15. The reciprocating wire saw device of claim 4 further comprised of a button that controls the motor.

16. The reciprocating wire saw device of claim 15, wherein the motor is comprised of a low speed, a medium speed and a high speed.

17. A method of using a reciprocating wire saw device, the method comprising the steps of:
   placing a first end of a wire blade into a first channel of a first oscillating arm;
   securing the first end of the wire blade into the first channel of the first oscillating arm via a first fastener of the first oscillating arm;
   placing the wire blade adjacent a pipe;
   placing a second end of the wire blade into a second channel of a second oscillating arm;
   securing the second end of the wire blade into the second channel of the second oscillating arm via a second fastener of the second oscillating arm;
   extending a plunger from a second end of a body of the reciprocating wire saw device so that the plunger pushes against the pipe to keep the wire blade in tension around the pipe; and
   depressing a trigger of the reciprocating wire saw device to activate a motor to cause the first oscillating arm and the second oscillating arm to oscillate,
   wherein the wire blade is a carbon wire blade, and wherein the plunger is a spring-loaded plunger.

* * * * *